(12) United States Patent
Uchiyama et al.

(10) Patent No.: US 8,392,041 B2
(45) Date of Patent: Mar. 5, 2013

(54) HYBRID VEHICLE

(75) Inventors: Kazunori Uchiyama, Okazaki (JP); Naoki Hakamada, Anjo (JP); Hideto Watanabe, Toyota (JP); Eiji Ichioka, Toyota (JP); Kunio Takeda, Kariya (JP)

(73) Assignees: Nippon Soken, Inc., Nishio-Shi (JP); Toyota Jidosha Kabushiki Kaisha, Toyota (JP)

( * ) Notice: Subject to any disclaimer, the term of this patent is extended or adjusted under 35 U.S.C. 154(b) by 644 days.

(21) Appl. No.: 12/451,765

(22) PCT Filed: Aug. 4, 2008

(86) PCT No.: PCT/JP2008/064377
§ 371 (c)(1),
(2), (4) Date: Nov. 30, 2009

(87) PCT Pub. No.: WO2009/020218
PCT Pub. Date: Feb. 12, 2009

(65) Prior Publication Data
US 2010/0185351 A1    Jul. 22, 2010

(30) Foreign Application Priority Data

Aug. 8, 2007   (JP) .................................. 2007-206277

(51) Int. Cl.
*B60L 9/00* (2006.01)
(52) U.S. Cl. ......................... 701/22; 180/65.29; 903/903
(58) Field of Classification Search .................. 701/22; 903/903, 915; 180/65.235, 65.265, 65.29
See application file for complete search history.

(56) References Cited

U.S. PATENT DOCUMENTS 6,209,672 B1 * 4/2001 Severinsky ................ 180/65.23
7,000,717 B2 * 2/2006 Ai et al. .................... 180/65.235

FOREIGN PATENT DOCUMENTS

| JP | A-3-74532    | 3/1991  |
| JP | A-3-235709   | 10/1991 |
| JP | A-6-318297   | 11/1994 |
| JP | A-2000-209706 | 7/2000  |
| JP | A-2003-284207 | 10/2003 |
| JP | A-2005-42701  | 2/2005  |
| JP | A-2005-237119 | 9/2005  |

OTHER PUBLICATIONS

Written Opinion of the International Searching Authority for International Application No. PCT/JP2008/064377, issued Oct. 21, 2008. (w/ translation).
Written Opinion of the International Preliminary Examining Authority for International Application No. PCT/JP2008/064377, Issued Feb. 24, 2009. (w/ translation).

(Continued)

Primary Examiner — Gertrude Arthur Jeanglaude
(74) Attorney, Agent, or Firm — Oliff & Berridge, PLC

(57) ABSTRACT

A hybrid vehicle includes an engine that is an internal combustion engine, a motor generator that is a rotating electric machine used together with the engine for driving the vehicle, an output shaft transmitting power to a wheel, a transmission member coupled to the output shaft, a power split device splitting the output from the engine to the motor generator and transmission member, a detection device detecting irregularities on a road, and a control unit reducing, when the detected result by the detection device indicates generation of periodic torque variation at the output shaft, the output from the engine based on the detected result. Accordingly, a hybrid vehicle that does not require a torque limiter is provided.

7 Claims, 7 Drawing Sheets

OTHER PUBLICATIONS

International Preliminary Report on Patentability for International Application No. PCT/JP2008/064377, issued May 12, 2009. (w/ translation).

Japanese Office Action for Application No. 2007-206277, issued Oct. 14, 2008. (w/ translation).

Japanese Office Action for Application No. 2007-206277, issued Feb. 17, 2009. (w/ translation).

Decision to Grant Patent for Application No. 2007-206277, issued Jul. 28, 2009. (w/ translation).

* cited by examiner

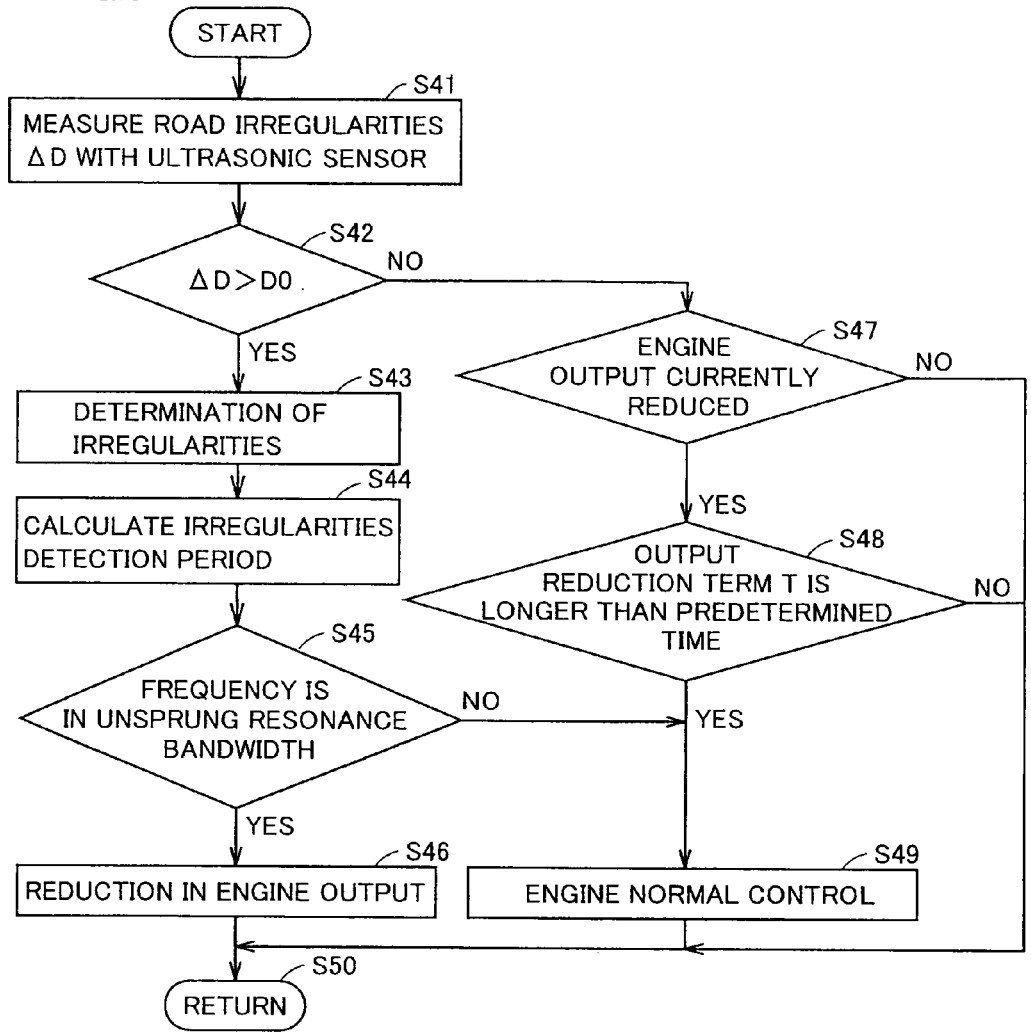
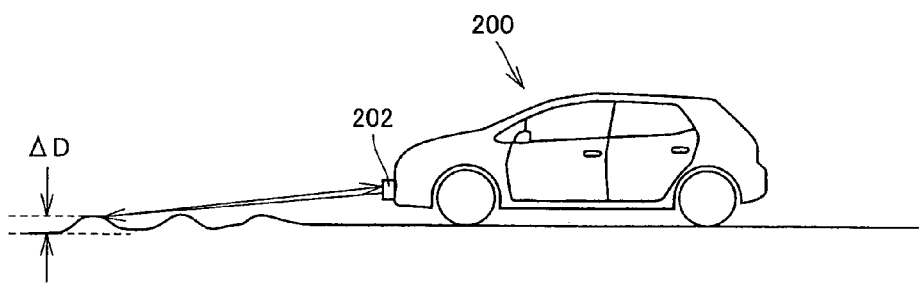

HYBRID VEHICLE

TECHNICAL FIELD

The present invention relates to hybrid vehicles, particularly a hybrid vehicle generating the driving force for the wheel using an internal combustion engine and a rotating electric machine together.

BACKGROUND ART

As a vehicle taking into account environmental issues, attention is now focused on hybrid vehicles that use a motor and engine together for driving the wheel. Some hybrid vehicles take advantage of the differential action of the planetary gear mechanism to control the rotational speed by means of the electric motor or motor generator connected to the planetary gear mechanism to drive the internal combustion engine at the optimum operating point. Such vehicles are configured to cover the excessive or insufficient driving force and engine braking force through the electric motor or motor generator, and further carry out energy regeneration in a deceleration mode to improve the fuel efficiency of the internal combustion engine.

Japanese Patent Laying-Open No. 2005-237119 discloses the technique of preventing the transmission of excessive torque to the output member of a power split device in a hybrid vehicle of the above-described configuration by increasing the rotational speed of the motor generator, when the rotational speed of the output member becomes lower by at least a predetermined amount, to suppress generation of inertia torque from the engine.

However, in the case where periodic torque variation is applied to the drive shaft such as in the case of running on a bumpy road in which irregularities continue successively and periodically, the variation will be transmitted to the input shaft through the power split device from the engine towards the power split device. When the frequency of this torque variation approximates the unsprung resonance point of the main body, variation at the drive shaft will increase to cause greater variation at the input shaft. If the unsprung resonance point matches the torsional resonance point of the input shaft, excessive torque will be generated at the input shaft.

Thus, since the generated torque will be excessive and periodic in the case where the input variation towards the input shaft varies periodically and intermittently, control of the motor generator cannot keep up with the variation. Accordingly, vibration cannot be suppressed and will become noticeable.

DISCLOSURE OF THE INVENTION

An object of the present invention is to provide a hybrid vehicle suppressed in occurrence of vibration.

The present invention is directed to a hybrid vehicle, including an internal combustion engine, a rotating electric machine used together with the internal combustion engine for driving the vehicle, an output shaft transmitting power to a driving wheel, a transmission member coupled to the output shaft, a power split device splitting the output from the internal combustion engine to the rotating electric machine and transmission member, a detection device detecting irregularities of a road, and a control unit reducing, when the detected result by the detection device indicates generation of periodic torque variation at the output shaft, the output from the internal combustion engine based on the detected result.

Preferably, the resonance frequency of a transmission mechanism transmitting power from the internal combustion engine to the transmission member via the power split device changes according to the output from the internal combustion engine. The control unit reduces the output from the internal combustion engine until the resonance frequency of the transmission mechanism falls outside an unsprung resonance bandwidth.

Preferably, the detection device includes a determination unit determining slipping of a wheel. The determination unit detects irregularities of the road based on the time interval of slipping occurring.

Preferably, the detection device includes a sensor detecting the rotational speed of the rotating electric machine. The detection device detects the irregularities of the road based on the difference between a rotational speed command value for the rotating electric machine and the actual rotational speed obtained from the output of the sensor.

Preferably, the detection device includes an ultrasonic sensor directing an ultrasonic wave to the road to detect the road irregularities.

According to another aspect of the present invention, a hybrid vehicle includes an internal combustion engine, a rotating electric machine used together with the internal combustion engine for driving the vehicle, an output shaft transmitting power to a driving wheel, a transmission member coupled to the output shaft, a power split device splitting the output from the internal combustion engine to the rotating electric machine and transmission member, a detection device detecting periodic torque variation generated at the output shaft, and a control unit reducing the output from the internal combustion engine based on a detected result from the detection device.

Preferably, the resonance frequency of a transmission mechanism transmitting power to the transmission member from the internal combustion engine via the power split device changes according to the output from the internal combustion engine. The control unit reduces the output from the internal combustion engine until the resonance frequency of the transmission mechanism falls outside the unsprung resonance bandwidth.

Preferably, the detection device includes a determination unit determining slipping of a wheel. The determination unit detects the period of torque variation generated at the output shaft based on the time interval of slipping occurring.

Preferably, the detection device includes a sensor detecting the rotational speed of the rotating electric machine. The detection device detects that torque variation is generated at the output shaft based on the difference between the rotational speed command value towards the rotating electric machine and the actual rotational speed obtained from the output of the sensor.

According to the present invention, vibration can be suppressed when the hybrid vehicle runs on a road where irregularities are present periodically.

BRIEF DESCRIPTION OF THE DRAWINGS

FIG. 9 is a flowchart of vibration suppress control executed in a third embodiment.

FIG. 10 is a diagram to describe a hybrid vehicle 200 of the third embodiment.

BEST MODES FOR CARRYING OUT THE INVENTION

Figure 1:
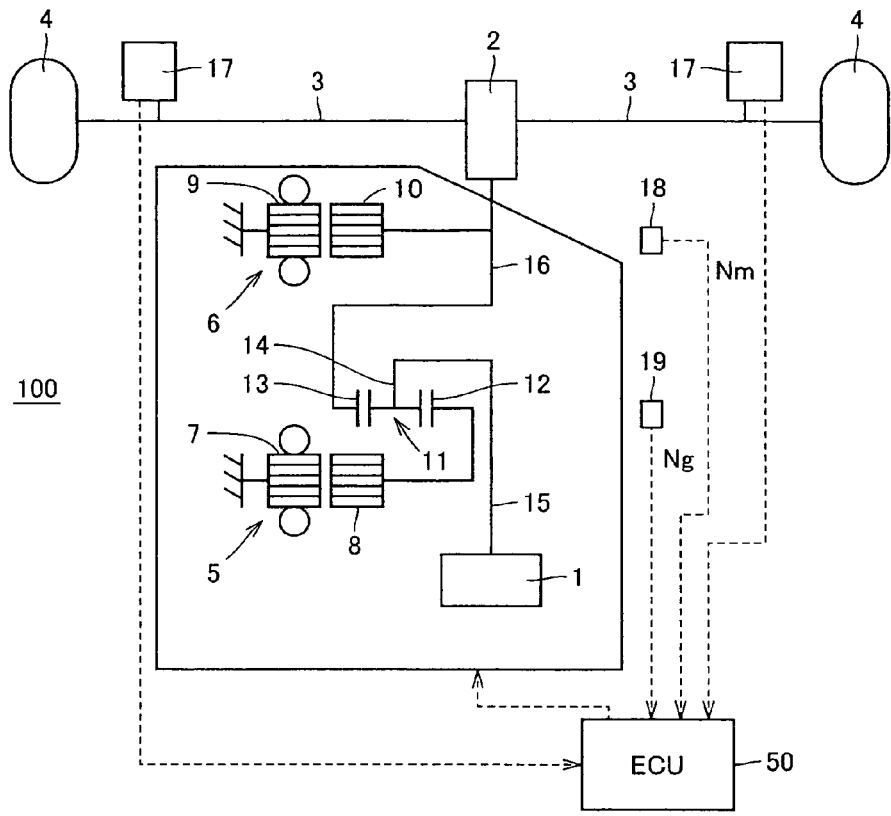
FIG. 1 is a skeleton view schematically representing a powertrain of a vehicle 100.

Embodiments of the present invention will be described in detail with reference to the drawings. In the drawings, the same or corresponding elements have the same reference characters allotted and the description thereof will not be repeated.

First Embodiment

FIG. 1 is a skeleton diagram schematically representing a powertrain of a vehicle 100.

Referring to FIG. 1, vehicle 100 includes an engine 1, a first motor generator 5, a power split device 11 splitting the power from engine 1 to first motor generator 5 and a transmission member 16, a second motor generator 6, and an electronic control unit (ECU) 50.

Engine 1 is the well-known power device such as a gasoline engine or diesel engine that provides power by burning fuel, configured to allow electrical control of the operation state such as the throttle degree of opening (intake amount), the fuel supply amount, ignition timing, and the like. Control of engine 1 is carried out by electronic control unit (ECU) 50 mainly based on a microcomputer, for example.

A synchronous electric motor, for example, can be used for first motor generator 5. First motor generator 5 is configured to function as an electric motor and as a generator. A battery (not shown) is electrically connected to first motor generator 5 via an inverter (not shown). By the control of this inverter through electronic control unit 50, the output torque or regenerative torque of first motor generator 5 is set appropriately. A stator 7 of first motor generator 5 is fixed to a casing (not shown), prohibited to rotate. Vehicle 100 further includes a resolver 19 detecting the rotational speed. Rotational speed Ng of first motor generator 5 is detected by resolver 19 and transmitted to electronic control unit 50.

Power split device 11 is formed of a planetary gear mechanism. This planetary gear mechanism is a well-known device causing differential action based on three rotation elements, i.e. a sun gear 12 that is the outer gear, a ring gear 13 that is an inner gear located concentrically with sun gear 12, and a carrier 14 retaining a pinion gear that engages with sun gear 12 and ring gear 13 to take an orbital motion while turning on its axis. Engine 1 is connected to carrier 14 that is the first rotation element via input shaft 15. Namely, carrier 14 functions as an input element.

A rotor 8 of first motor generator 5 is coupled to sun gear 12 that is the second rotation element. Accordingly, sun gear 12 functions as a reactive element towards engine 1. Ring gear 13 that is the third rotation element and the output element of power split device 11 is connected to transmission member 16.

A configuration in which a switchable reduction gear or speed reducer is provided at transmission member 16 of power split device 11 may also be employed.

A rotor 10 of second motor generator 6 is connected to transmission member 16 to add/reduce the output torque from second motor generator 6 to/from the torque transmitted by transmission member 16.

Second motor generator 6 is also connected to a battery (not shown) via an inverter (not shown). Electronic control unit 50 mainly based on a microcomputer controls the inverter (not shown) such that the power running mode and regeneration mode of second motor generator 6 as well as the torque and rotational speed in respective modes are controlled. A stator 9 of second motor generator 6 is fixed to a casing (not shown). Vehicle 100 further includes a resolver 18 that detects the rotational speed. A rotational speed Nm of second motor generator 6 is detected and transmitted to electronic control unit 50 by resolver 18.

Transmission member 16 is coupled to an output shaft (drive shaft) 3 via a differential 2. Output shaft 3 is coupled to a wheel 4.

The operation under optimum fuel efficiency of engine 1 is carried out by continuously modifying (stepless) the rotational speed of engine 1 based on the change of the rotational speed of motor generator 5 to a faster or slower level. Namely, the stepless transmission control setting the rotational speed of engine 1 to the level of best fuel efficiency, for example, can be effected by controlling the rotational speed of motor generator 5.

In the case where periodic torque variation is applied to output shaft 3 such as in the case of running on a road on which irregularities continue successively and periodically, the variation is transmitted to input shaft 15 via power split device 11. If the frequency of the torque variation approximates the unsprung resonance point of the vehicle body, variation at output shaft 3 will be increased, and variation at input shaft 15 will also increase. When the unsprung resonance point matches the torsional resonance point of input shaft 15, excessive torque will be generated at input shaft 15.

To prevent generation of such excessive torque, vehicle 100 additionally includes a road irregularities detection device 17.

Figure 2:
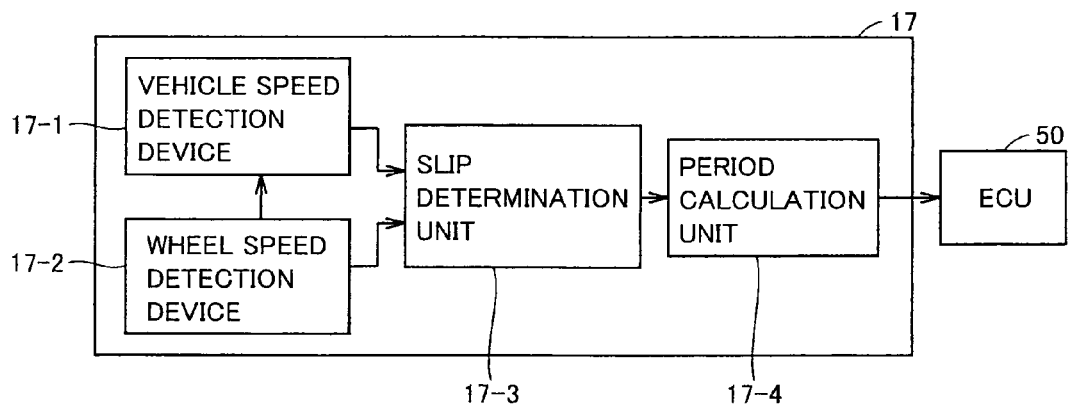
FIG. 2 is a block diagram representing a configuration of a road irregularities detection device 17.

FIG. 2 is a block diagram representing a configuration of road irregularities detection device 17.

Referring to FIG. 2, road irregularities detection device 17 includes a vehicle speed detection device 17-1, a wheel speed detection device 17-2, a slip determination unit 17-3, and a period calculation unit 17-4.

Wheel speed detection device 17-2 detects the rotational speed of the wheel. Vehicle speed detection device 17-1 detects the vehicle speed by averaging and filtering the wheel speed of a plurality of wheels. Slip determination unit 17-3 determines slipping occurrence when a calculated difference between the vehicle speed and wheel speed exceeds a predetermined value. Period calculation unit 17-4 detects the time interval between slipping occurrences to calculate the slip period, and requests ECU 50 to reduce the engine output when the result is within a predetermined range of the resonance frequency region.

The reason why reduction in engine output is requested is that the torsional resonance frequency of input shaft 15 is altered when the engine output changes.

Figure 3:
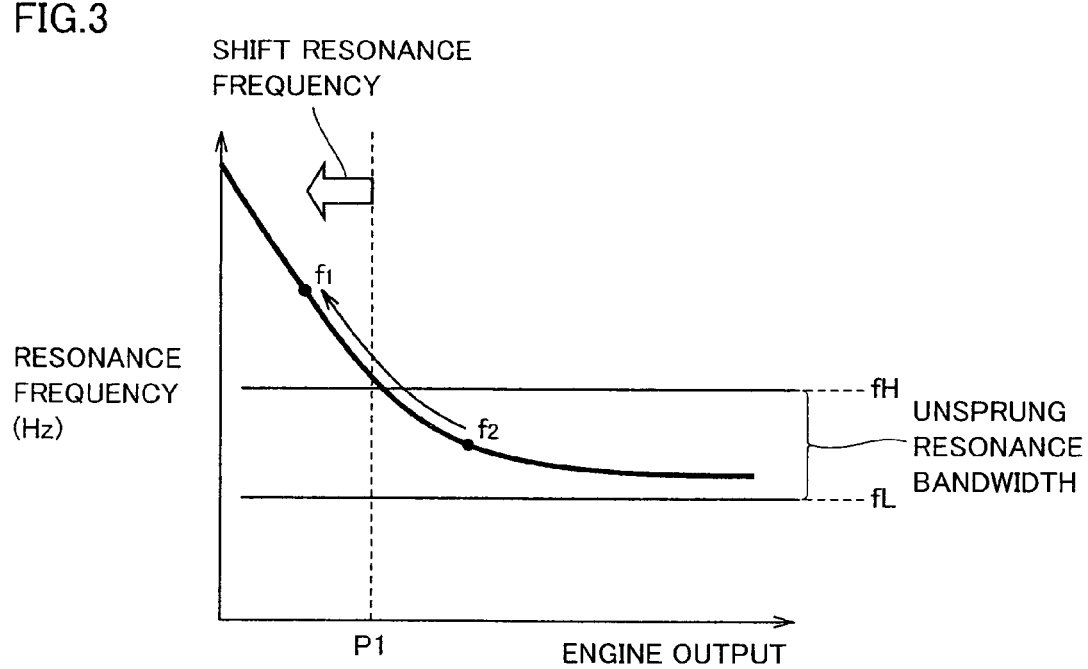
FIG. 3 represents an example of the relationship between the engine output and the torsional resonance frequency of the input shaft.

FIG. 3 represents an example of the relationship between the engine output and the torsional resonance frequency of the input shaft.

Referring to FIG. 3, the engine output is plotted along the horizontal axis whereas the resonance frequency (Hz) is plotted along the vertical axis. It is appreciated that the torsional resonance frequency of input shaft 15 of FIG. 1 is altered nonlinearly when the engine output changes. The resonance frequency differs greatly between a low output and high output from the engine. The example of FIG. 3 shows that increase of the engine output causes reduction in the torsional resonance frequency of input shaft 15 of FIG. 1. When engine output becomes greater than P1, the resonance frequency of input shaft 15 will fall into the unsprung resonance bandwidth.

Unsprung resonance is the resonance encountered when components lower than the spring (suspension) of the suspension device vibrate. Such resonance occurs in the event of running on a bumpy road with continuous irregularities.

Referring to FIGS. 1 and 3, periodic torque variation is applied to output shaft 3 when running on a road with continuous irregularities (for example, rough roads, the joint at highways, and the like). This torque variation will be transmitted to input shaft 15 via power split device 11.

If the frequency of this periodic torque variation is in the vicinity of the unsprung resonance point of the vehicle body, the variation at output shaft 3 increases. This unsprung resonance bandwidth corresponds to a fixed value determined depending upon the weight of the components, spring rate of the suspension, and the like. When the resonance frequency of input shaft 15 at this stage matches this resonance region, the torque variation will be further amplified at the powertrain to be transmitted, causing the generation of excessive torque at input shaft 15. In view of excessive torque generation at input shaft 15, the so-called torque limiter mechanism taking advantage of friction between the engine and motor generator may have to be installed to absorb such excessive torque variation. Such a torque limiter mechanism serves to block power transmission when the output torque of the engine or motor generator reaches a predetermined value. However, providing a torque limiter mechanism will induce more components, disadvantageous from the standpoint of cost.

The present embodiment is directed to effecting engine control so as to reduce the engine output when periodic torque variation is applied to output shaft 3, or when road irregularities that may cause such periodic torque variation is detected. Accordingly, the torsional resonance frequency of input shaft 15 is altered to f1 from f2, allowing the resonance frequency of input shaft 15 to fall outside the unsprung resonance bandwidth. Thus, generation of excessive torque at input shaft 15 is suppressed, dispensed with a torque limiter mechanism.

Figure 4:
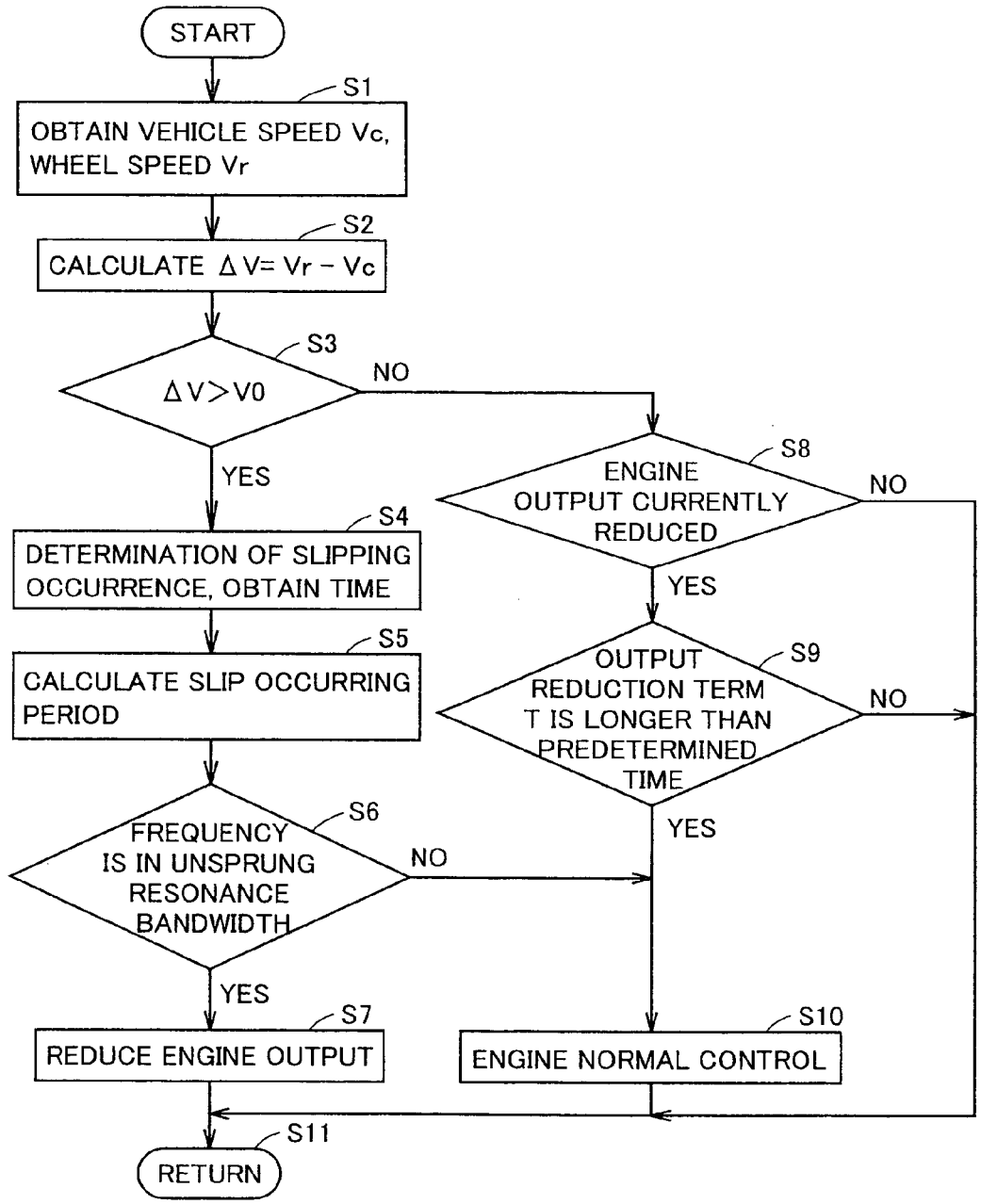
FIG. 4 is a flowchart of control related to reducing vibration at a hybrid vehicle, executed according to a first embodiment.

FIG. 4 is a flowchart of control related to reducing vibration at the hybrid vehicle, executed in the first embodiment. The process steps in the flowchart are invoked and executed from a predetermined main routine at every elapse of a predetermined time or occurrence of a predetermined condition.

Referring to FIG. 4, vehicle speed Vc and wheel speed Vr are obtained at step S1. For example, wheel speed Vr is identified by a sensor corresponding to wheel speed detection device 17-2 of FIG. 2. Wheel speed Vr is a value obtained by multiplying the rotational speed (rpm) detected by wheel speed detection device 17-2 by two times the tire radius r (diameter) and circle ratio, so converted to allow comparison with the vehicle speed. Vehicle speed Vc can be obtained by, for example, vehicle speed detection device 17-1 by averaging the wheel speed Vr of 2 wheels (or 4 wheels) located at the left and right sides, and further applying time-filtering processing. Vehicle speed Vc may be obtained by another method such as based on the rotational speed of the drive shaft.

At step S2, the difference between the wheel speed and vehicle speed ΔV=Vr−Vc is obtained. At step S3, determination is made as to whether ΔV is larger than a predetermined threshold value V0.

When ΔV>V0 is not established at step S3, control proceeds to step S8. In the case where ΔV>V0 is established at step S3, control proceeds to step S4.

At step S4, determination is made that slipping had occurred at the wheel, and the time of slipping occurrence is obtained. At step S5 following step S4, the difference between the point of time of the previous slipping and the point of time of the current slipping is obtained to calculate the slip occurring period. The slip occurring frequency f is obtained from the inverse number of period T.

At step S6, determination is made as to whether the slip frequency f obtained at step S5 falls within the unsprung resonance bandwidth described with reference to FIG. 3.

When slip frequency f does not fall within the unsprung resonance bandwidth (between fH and fL) at step S6, control proceeds to step S10 since unsprung resonance will not occur. At step S10, the general control of engine in the hybrid vehicle is executed. At this stage, if the battery state of charge (SOC) is sufficient, the drive of the vehicle is carried out by the motor alone with the engine stopped at the time of startup or in a low speed running mode. When the state of charge of the battery becomes low, the drive of the vehicle is carried out with the engine operating in a high speed running mode or rapid acceleration mode.

In the case where slip frequency f falls within the unsprung resonance bandwidth (between fH and fL) at step S6, there is a possibility of unsprung resonance occurring. If the engine output is high in such a case, the torsional resonance frequency of input shaft 15 may match the unsprung resonance frequency to lead to the possibility of excessive torque at the input shaft, as described with reference to FIG. 3. In view of this possibility, the process of reducing the engine output lower than P1 is executed at step S7. This process of reducing the engine power lower than P1 can be carried out by prohibiting fuel injection, i.e. the so-called fuel cut. Modifying the setting of the amount of fuel injection, throttle opening, ignition time, valve timing and the like may be carried out instead of the aforementioned fuel cut to reduce the engine output lower than P1. Accordingly, the torsional resonance frequency of input shaft 15 will fall outside the unsprung resonance bandwidth to suppress vibration. Then, control returns to the main routine at step S11 subsequent to the process of step S7.

In the case where ΔV>V0 is not established at step S3 and control proceeds to step S8, determination is made as to whether the reduction of engine output at current step S7 continues or not. When the engine output is currently reduced at step S8, control proceeds to step S9 to determine whether the output reduction term T is longer than a predetermined time.

In the case where the engine output is not currently reduced at step S8, or when the output reduction term is not longer than the predetermined time at step S9, control proceeds to step S11, and the engine output is maintained at the current level. This prevents frequent repetition between reduction of the engine output and return to the normal output level.

When output reduction term T is longer than a predetermined time at step S9, control proceeds to step S10 where output reduction of the engine is canceled and the engine returns to normal control. Then, control returns to the main routine at step S11, subsequent to the process of step S10.

Figure 5:
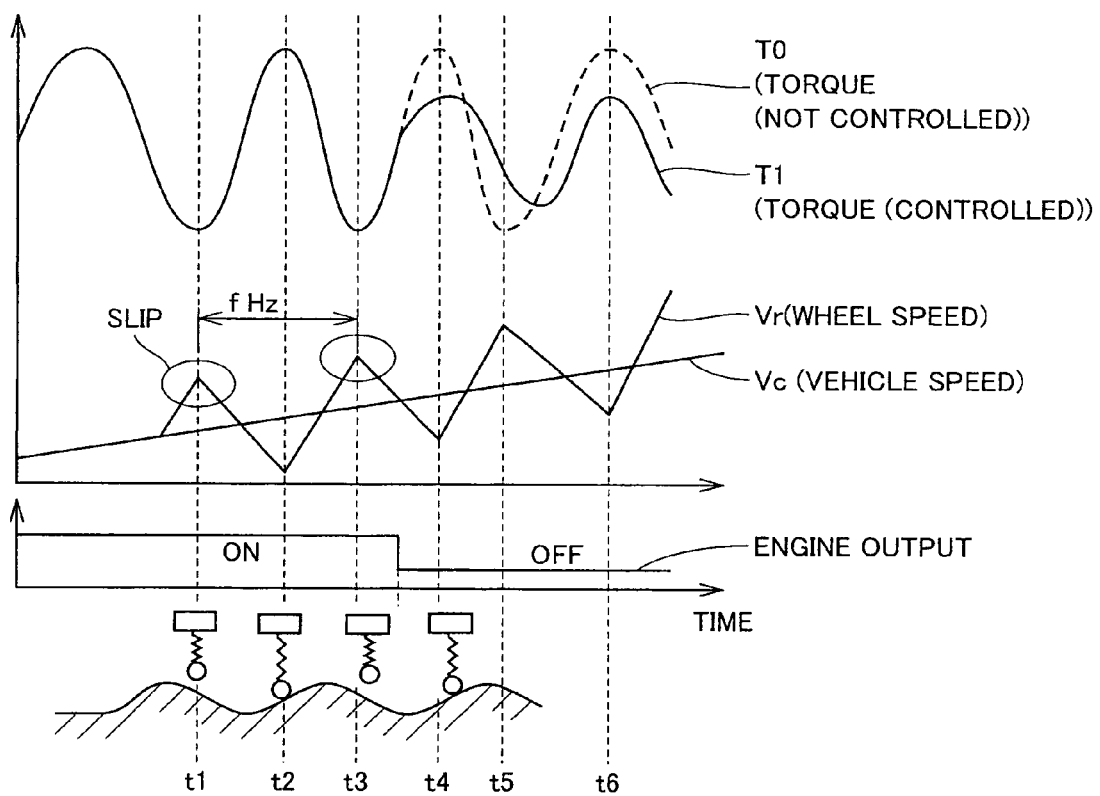
FIG. 5 is an operation waveform diagram to describe an operation of the hybrid vehicle of the first embodiment.

FIG. 5 is an operation waveform diagram to describe an operation of the hybrid vehicle of the first embodiment.

Referring to FIG. 5, the road under the wheel is recessed at time t1, and wheel 4 of FIG. 1 runs idle in a floating state from the road surface. Accordingly, wheel speed Vr becomes greater than vehicle speed Vc by more than a threshold value V0, leading to detection of slipping. Moreover, the idle rotation at the wheel causes lower torsional torque at input shaft 15 of FIG. 1.

At time t2, the road surface under the wheel corresponds to an upwardly convexity so that wheel 4 will form contact with the road surface. Wheel speed Vr becomes lower than vehicle speed Vc. This state corresponds to a gripping state, not a slipping state. At this stage, the torsional torque of input shaft 15 of FIG. 1 is greater than that of time t1.

At time t3, the road face under the wheel is recessed again, so that wheel 4 of FIG. 1 runs idle in a floating state from the road face. Accordingly, wheel speed Vr becomes greater than vehicle speed Vc by more than threshold value V0, leading to detection of slipping again. As a result of idle rotation at the wheel, the torsional torque at input shaft 15 of FIG. 1 becomes smaller. Slip occurring frequency f is calculated from the time interval between the previous slipping occurrence and current slipping occurrence (t3-t1).

Since slip occurring frequency f falls within the unsprung resonance bandwidth (between fH and fL of FIG. 3), ECU 50 switches the engine output to an OFF state from an ON state. The engine output may be set to become smaller than output P1 shown in FIG. 3, instead of being turned OFF.

At time t4 and et seq., the variation width becomes smaller as indicated by torque T1 in accordance with reduction in the engine output, which otherwise would have been continuously great in amplitude as indicated by torque T0.

Thereafter, the torque variation width is reduced to suppress vibration even if the vehicle runs on irregularities of a road face at a similar period at time t5 and time t6.

In the case where the engine output rendered OFF causes change in the slip occurring frequency by speed reduction so that generation of unsprung resonance is eliminated, the engine is returned to the operable state, as necessary. Further, the engine is similarly returned to an operable state in the case where the road face state changes and the slip occurring frequency is altered.

In the first embodiment, the engine output is temporarily reduced (or stopped) when the slip occurring frequency matches the unsprung resonance frequency region that is determined depending upon the vehicle configuration, avoiding excessive torque generation by shifting the torsional resonance point of the input shaft. Thus, vibration at the hybrid vehicle can be suppressed from being amplified.

Second Embodiment

In a hybrid vehicle, connection between engine 1 and the driving device is established absent of a fluid coupling or the like. Therefore, when the rotational speed of the wheel suddenly changes such as in the case of harsh braking, parking lock engagement at the time of or moving, parking lock release in a slope stop mode, or change in the friction coefficient of the road, the rotational speed of engine 1 will not follow-up with the change, leading to change in the relative rotational speed of engine 1 to transmission member 16. Further, there is a possibility of excessive torque being added to transmission member 16 by the so-called inertia torque of the engine.

In order to prevent such excessive increase in torque, the control set forth below will be carried out.

Figure 6:
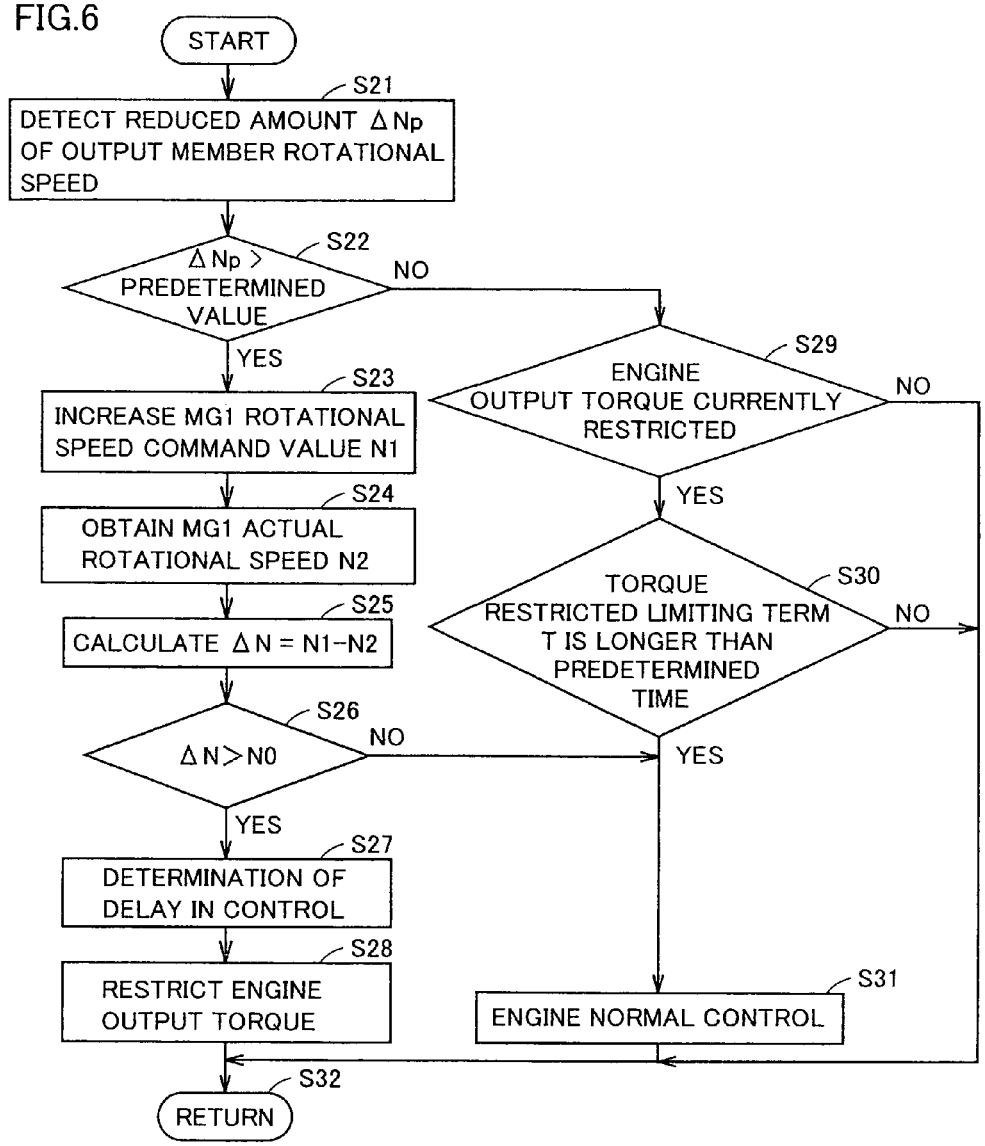
FIG. 6 is a flowchart of vibration suppress control when the speed is rapidly reduced, executed in a second embodiment.

FIG. 6 is a flowchart of vibration suppress control in a rapid deceleration mode executed in the second embodiment. The process steps in the flowchart are invoked and executed from a predetermined main routine at every elapse of a predetermined time or occurrence of a predetermined condition.

Referring to FIGS. 1 and 6, upon initiation of the process, reduction amount ΔNp of the rotational speed of transmission member 16 is detected at step S21. This rotational speed reduction amount is obtained by subtracting the rotational speed a predetermined time ago from the current relative rotational speed. Therefore, a great reduction in this amount of rotational speed implies that rapid deceleration is occurring.

At step S22, determination is made as to whether this rotational speed reduction amount ΔNp has exceeded a predetermined value. When determination is made that ΔNp has not exceeded the predetermined value at step S22, control proceeds to step S29. In the case where rotational speed reduction amount ΔNp exceeds the predetermined value at step S22, determination is made that rapid change in the rotational speed has occurred so that the rotation of engine 1 cannot follow-up with the change in the rotational speed of transmission member 16, leading to generation of inertia torque.

In this case, the rotational speed of first motor generator 5 (MG1) is immediately increased at step S23, whereby generation of inertia torque is suppressed.

Figure 7:
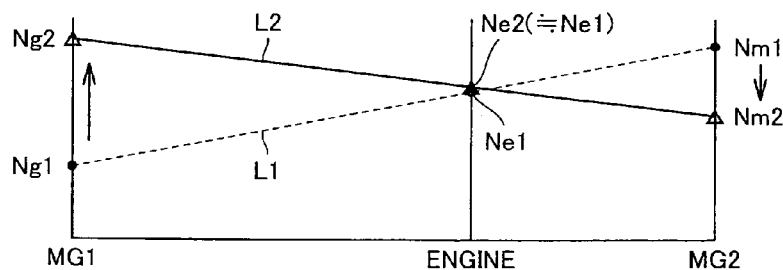
FIG. 7 is a nomographic chart for describing suppression of inertia torque generation.

FIG. 7 is a nomographic chart to describe suppressing generation of inertia torque.

Referring to FIG. 7, when rotational speed Nm1 of transmission member 16 (MG2) in a normal running mode rapidly drops to rotational speed Nm2, an operation to further reduce rotational speed Ne1 of engine 1 will occur. However, an attempt to rapidly change the rotational speed will cause torque corresponding to the rate of change since the inertia moment of engine 1 is great.

In view of this issue, rotational speed Ng of first motor generator 5 (MG1) is increased from rotational speed Ng1 to rotational speed Ng2 simultaneous to the rapid reduction of rotational speed Nm of transmission member 16 (MG2). Accordingly, rotational speed Ne of engine 1 will attain the level of Ne2 that is substantially equal to Ne1. Thus, the rate of change of the rotational speed of engine can be suppressed to restrain the amount of torque generated by the inertia.

In other words, even in the case where the rotational speed of the output member is altered rapidly, the rotational speed of first motor generator 5 can be changed to suppress the inertia torque of engine 1. Therefore, transmission of excessive torque from engine 1 to transmission member 16 can be prevented.

However, in the case where the vehicle runs on a road with periodic repetition of irregularities, unsprung resonance will occur and the torsional resonance frequency of input shaft 15 may match the unsprung resonance frequency region, as described in the first embodiment. Excessive torque will be generated at transmission member 16 and/or input shaft 15, resulting in delay in the follow-up of the rotational speed of first motor generator 5, such that the vibration may not be sufficiently suppressed. In this case, since excessive torque is generated at input shaft 15 by the presence of road irregularities, the engine output is reduced, as shown in FIG. 3, to cause the torsional resonance frequency of input shaft 15 to fall outside the unsprung resonance bandwidth. Thus, excessive torque is eliminated, and vibration at the vehicle body is suppressed.

FIG. 6 corresponds to the process where such delay in follow-up is detected at steps S24-S26. At step S23, a command value N1 of the rotational speed of first motor generator 5 (MG1) is increased. At the elapse of a predetermined time, the actual rotational speed N2 of first motor generator 5 is obtained by resolver 19 at step S24. Then, at step S25, the difference between command value N1 and actual rotational speed N2, i.e. $\Delta N=N1-N2$, is detected.

At step S26, determination is made as to whether the obtained difference $\Delta N$ is greater than a predetermined value N0. When $\Delta N>N0$ is established, control proceeds to step S27. When $\Delta N>N0$ is not established, control proceeds to step S31.

At step S27, determination is made that there is delay in control, and torque restriction on the engine output is executed at step S28.

In the case where control proceeds to step S29, determination is made as to whether restriction on the engine output torque corresponding to step S28 is currently executed according to previous execution of the flowchart. When determination is made at step S29 that the engine output torque is currently restricted, control proceeds to step S30 where determination is made as to whether a term T of continuing torque restriction is longer than a predetermined time. When determination is made that term T of continuing torque restriction is longer than the predetermined time at step S30, control proceeds to step S31.

In the case where the engine output torque is currently not restricted at step S29, or when the term of torque restriction is not longer than the predetermined time at step S30, control proceeds to step S32 to return to the main routine.

In the case where control proceeds to step S31, restriction on the output torque of the engine is canceled, and normal engine control is executed. Upon execution of step S31, control proceeds to step S32 to return to the main routine.

Figure 8:
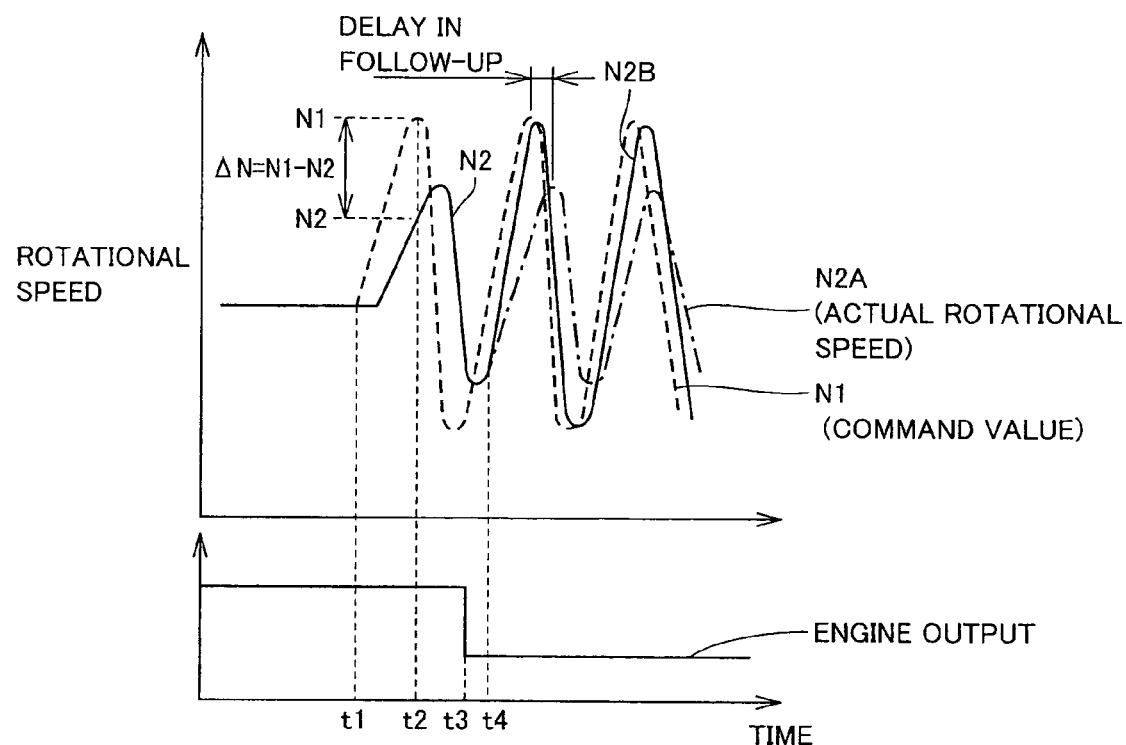
FIG. 8 is an operation waveform diagram to describe an operation of the second embodiment.

FIG. 8 is an operation waveform diagram to describe the operation of the second embodiment.

Referring to FIG. 8, command value N1 of the rotational speed of first motor generator 5 (MG1) is increased at time t1. The follow-up of actual rotational speed N2 is initiated with delay. At time t2, ECU 50 detects delay in control since difference $\Delta N=N1-N2$ exceeds a predetermined value. In response, ECU 50 determines that excessive torque is generated at input shaft 15 or transmission member 16. At time t3, the engine output is altered from an ON state to an OFF state to be reduced.

Accordingly, the torsional resonance frequency of input shaft 15 falls outside the unsprung resonance bandwidth, as shown in FIG. 3. Generation of excessive torque is suppressed, and the rotational speed of first motor generator 5 (MG1) is modified favorably following command value N1, as indicated by actual rotational speed N2B.

Thus, in the second embodiment, irregularities of the road surface or generation of excessive torque variation at output shaft 3 or input shaft 15 is detected according to a method different from that of the first embodiment. Then, the engine output is temporarily reduced (or stopped) to shift the torsional resonance point of the input shaft to avoid generation of excessive torque. Therefore, amplification of the vibration at the hybrid vehicle can be suppressed in the second embodiment.

Third Embodiment

In the first and second embodiments, irregularities of a road surface is detected to reduce the engine output by detecting change in the vehicle state that occurs after the wheel passes over the irregularities of the road. However, generation of unsprung resonance caused by road irregularities can be detected by another method. For example, the road surface can be examined by a non-contact sensor such as an ultrasonic sensor.

FIG. 10 is a diagram to describe a hybrid vehicle 200 of the third embodiment.

Hybrid vehicle 200 of FIG. 10 includes, in addition to the configuration of hybrid vehicle 100 described with reference to FIG. 1, an ultrasonic sensor 202 attached at the front side of the vehicle.

Ultrasonic sensor 202 can identify the irregularities of the road by directing an ultrasonic wave towards the region of the road surface located forward of the vehicle and detecting the reflected ultrasonic wave.

FIG. 9 is a flowchart of the vibration suppress control executed in the third embodiment. The process steps in the flowchart are invoked and executed from a predetermined main routine at every elapse of a predetermined time or occurrence of a predetermined condition.

Referring to FIG. 9, upon initiation of the process, the irregularities $\Delta D$ of the region of the road in front of the vehicle is measured by ultrasonic sensor 202 at step S41. At step S42, determination is made as to whether $\Delta D$ is larger than a predetermined value D0. When $\Delta D>D0$ is not established, determination is made that there are no irregularities of the road at step S42, and control proceeds to step S47.

When $\Delta D>D0$ is established at step S42, control proceeds to step S43. At step S43, determination is made that there are irregularities of the road, and the current time is obtained. At step S44 subsequent to step S43, the difference between the time when the previous detection of road irregularities had been made and the time of the current detection of road irregularities is obtained to calculate the irregularities detection period. Irregularities detection frequency f is obtained from the inverse number of that period T.

At step S45, determination is made as to whether irregularities detection frequency f obtained at step S44 falls in the unsprung resonance bandwidth described with reference to FIG. 3.

When irregularities detection frequency f does not fall in the unsprung resonance bandwidth (between fH and fL) at step S45, control proceeds to step S49 since unsprung resonance will not occur. At step S49, the engine has normal control executed at the hybrid vehicle. At this stage, if the battery state of charge (SOC) is sufficient, the drive of the vehicle is carried out by the motor alone with the engine stopped at the time of startup or in a low speed running mode. When the state of charge of the battery becomes low, the drive of the vehicle is carried out with the engine operating in a high speed running mode or rapid acceleration mode. At step S50 following the process of step S49, control returns to the main routine.

In the case where irregularities detection frequency f falls in the unsprung resonance bandwidth (between fH and fL) at step S45, there is a possibility of unsprung resonance being generated. If the engine output is high in this stage, the torsional resonance frequency of input shaft 15 may match the unsprung resonance frequency, as described with reference to FIG. 3, to cause generation of excessive torque at the input shaft. In view of this issue, the process of reducing the engine output lower than P1 is carried out at step S46. Alternatively, a more simple control of setting the engine output to zero, i.e. turning off the engine, may be carried out. Accordingly, the torsional resonance frequency of input shaft 15 will fall outside the unsprung resonance bandwidth, so that vibration is suppressed. At step S50 following the process of step S46, control returns to the main routine.

In the case where ΔD>D0 is not established at step S42 and control proceeds to step S47, determination is made as to whether reduction of the engine output corresponding to step S46 is currently continued or not. When determination is made that the engine output is reduced currently at step S47, control proceeds to step S48 to determine whether the output reduction term T is longer than a predetermined time.

In the case where determination is made at step S47 that the engine output is not currently reduced, or at step S48 that the output reduction term is not longer than the predetermined time, control proceeds to step S50 where the engine output is maintained at the current level. This prevents frequent repetition between reduction of the engine output and return to the normal output level.

In the case where output reduction term T is longer than the predetermined time at step S48, control proceeds to step S49 where the output reduction from the engine is canceled, and the engine enters a normal control mode. At step S50 following the process of step S49, control returns to the main routine.

In the third embodiment, the road irregularities are detected in a manner different from that of the first and second embodiments. When detection is made that the irregularities will be encountered at a predetermined period, the engine output is temporarily reduced (or stopped), and the torsional resonance point of the input shaft is shifted to avoid generation of excessive torque. Therefore, the vibration at the hybrid vehicle can be suppressed from being amplified in the third embodiment.

The road irregularities may be detected using a non-contact sensor based on a laser beam, an electric wave such as millimeter wave, or the like, instead of an ultrasonic wave.

The first to third embodiments will be generically described with reference to FIG. 1 and other drawings. Hybrid vehicle 100 includes engine 1 that is an internal combustion engine, motor generator 5 that is a rotating electric machine used together with engine 1 for driving the vehicle, output shaft 3 transmitting power to wheel 4, transmission member 16 coupled to output shaft 3, power split device 11 splitting the output from engine 1 to motor generator 5 and transmission member 16, a detection device detecting irregularities of the road, and control unit 50 reducing the output from engine 1 based on a detected result by the detection device when the detected result indicates generation of periodic torque variation at output shaft 3.

As shown in FIG. 3, the resonance frequency of the transmission mechanism transmitting power to transmission member 16 from engine 1 via power split device 11 changes according to the output from engine 1. Control unit 50 reduces the output from engine 1 until the resonance frequency of the transmission mechanism falls outside the unsprung resonance bandwidth.

As shown in FIG. 2, detection device 17 preferably includes a slip determination unit 17-3 that determines wheel slipping. The slip determination unit detects irregularities of the road surface based on the difference between the wheel speed and vehicle speed.

The detection device preferably includes sensor 19 detecting the rotational speed of the rotating electric machine. As shown in FIG. 8, the detection device detects the road irregularities based on the difference between rotational speed command value N1 for the rotating electric machine and the actual rotational speed N2 obtained from the output of the sensor.

As shown in FIG. 9, the detection device preferably includes ultrasonic sensor 202 that directs an ultrasonic wave to the road to detect irregularities of the road.

By such a configuration, generation of excessive torque is prevented, and vibration at the vehicle is suppressed.

It should be understood that the embodiments disclosed herein are illustrative and non-restrictive in every respect. The scope of the present invention is defined by the appended claims, rather than the description set forth above, and all changes that fall within limits and bounds of the claims, or equivalent thereof are intended to be embraced by the claims.

The invention claimed is:

1. A hybrid vehicle comprising:
an internal combustion engine,
a rotating electric machine used together with the internal combustion engine for driving the vehicle,
an output shaft transmitting power to a driving wheel,
a transmission member coupled to the output shaft,
a power split device splitting an output from the internal combustion engine to the rotating electric machine and the transmission member,
a detection device detecting irregularities of a road, and
a control unit reducing, when a detected result by the detection device indicates generation of periodic torque variation at the output shaft, the output from the internal combustion engine based on the detected result,
wherein a resonance frequency of a transmission mechanism transmitting power to the transmission member from the internal combustion engine via the power split device changes according to the output from the internal combustion engine, and
the control unit reduces the output from the internal combustion engine until the resonance frequency of the transmission mechanism goes outside an unsprung resonance bandwidth.

2. The hybrid vehicle according to claim 1, wherein
the detection device includes a determination unit determining slipping of the wheel, and
the determination unit detects irregularities of the road based on a time interval of the slipping occurring.

3. The hybrid vehicle according to claim 1, wherein
the detection device includes a sensor detecting a rotational speed of the rotating electric machine, and
the detection device detects irregularities of the road based on a difference between a rotational speed command value towards the rotating electric machine and an actual rotational speed obtained from an output of the sensor.

4. The hybrid vehicle according to claim 1, wherein the detection device includes an ultrasonic sensor directing an ultrasonic wave onto the road to detect irregularities of the road.

5. A hybrid vehicle comprising:
an internal combustion engine,
a rotating electric machine used together with the internal combustion engine for driving the vehicle,
an output shaft transmitting power to a driving wheel,
a transmission member coupled to the output shaft,
a power split device splitting an output from the internal combustion engine to the rotating electric machine and the transmission member,
a detection device detecting periodic torque variation generated at the output shaft, and
a control unit reducing the output from the internal combustion engine based on a detected result by the detection device,
wherein a resonance frequency of a transmission mechanism transmitting power to the transmission member from the internal combustion engine via the power split device changes according to the output from the internal combustion engine, and the control unit reduces the output from the internal combustion engine until the resonance frequency of the transmission mechanism goes outside an unsprung resonance bandwidth.

6. The hybrid vehicle according to claim 5, wherein
the detection device includes a determination unit determining slipping of the wheel, and
the determination unit detects a period of generation of torque variation at the output shaft based on a time interval of the slipping occurring.

7. The hybrid vehicle according to claim 5, wherein
the detection device includes a sensor detecting a rotational speed of the rotating electric machine, and
the detection device detects generation of torque variation at the output shaft based on a difference between a rotational speed command value towards the rotating electric machine and an actual rotational speed obtained from an output of the sensor.

* * * * *